Sept. 19, 1939.                G. SABOL ET AL                2,173,768
                        TALKING MOTION PICTURE SYSTEM
                Original Filed Sept. 7, 1938    3 Sheets-Sheet 1

Inventor
George Sabol
Michael Sabol
John Sabol

By Clarence A. O'Brien
and Hyman Berman
Attorneys

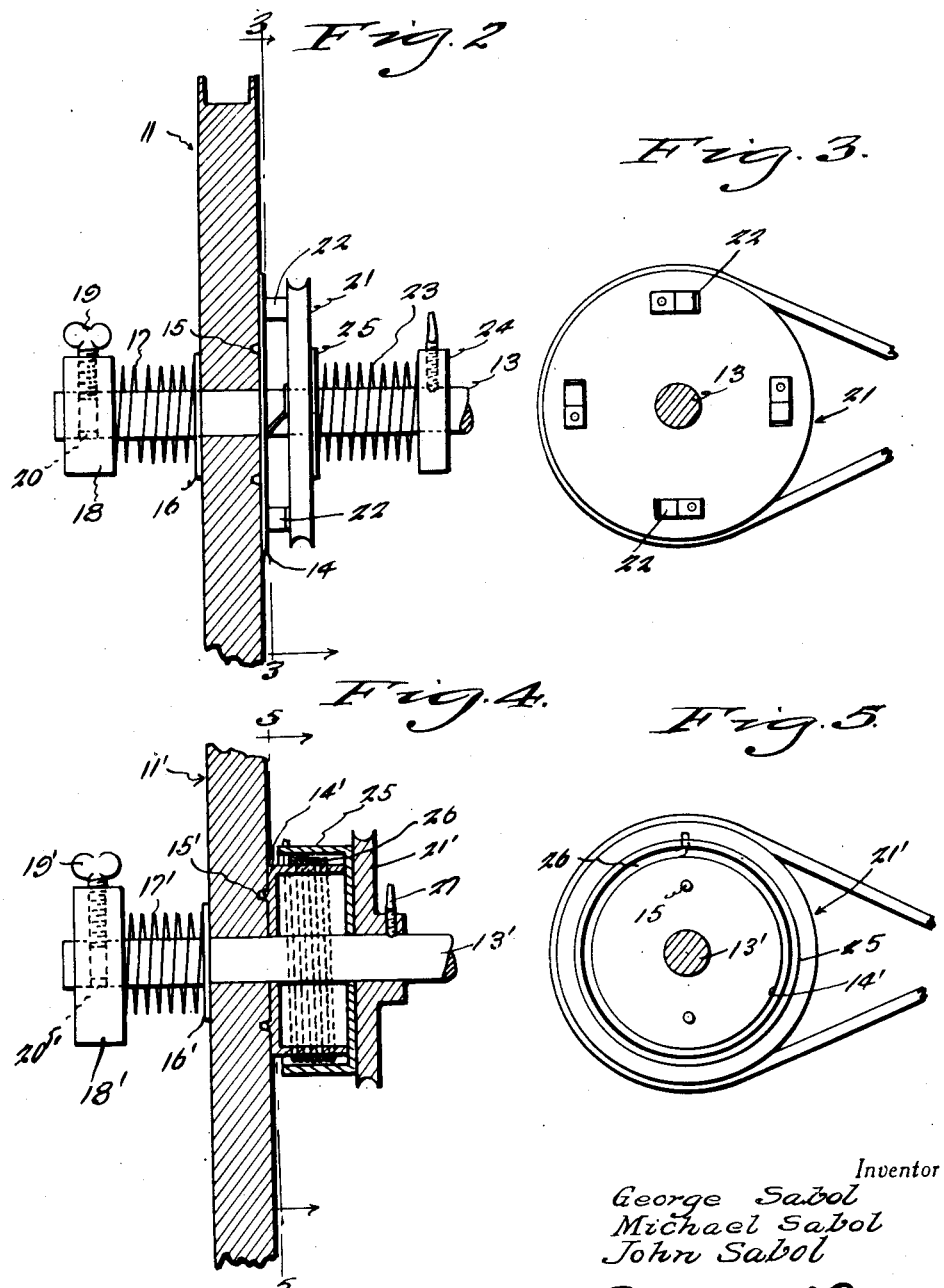

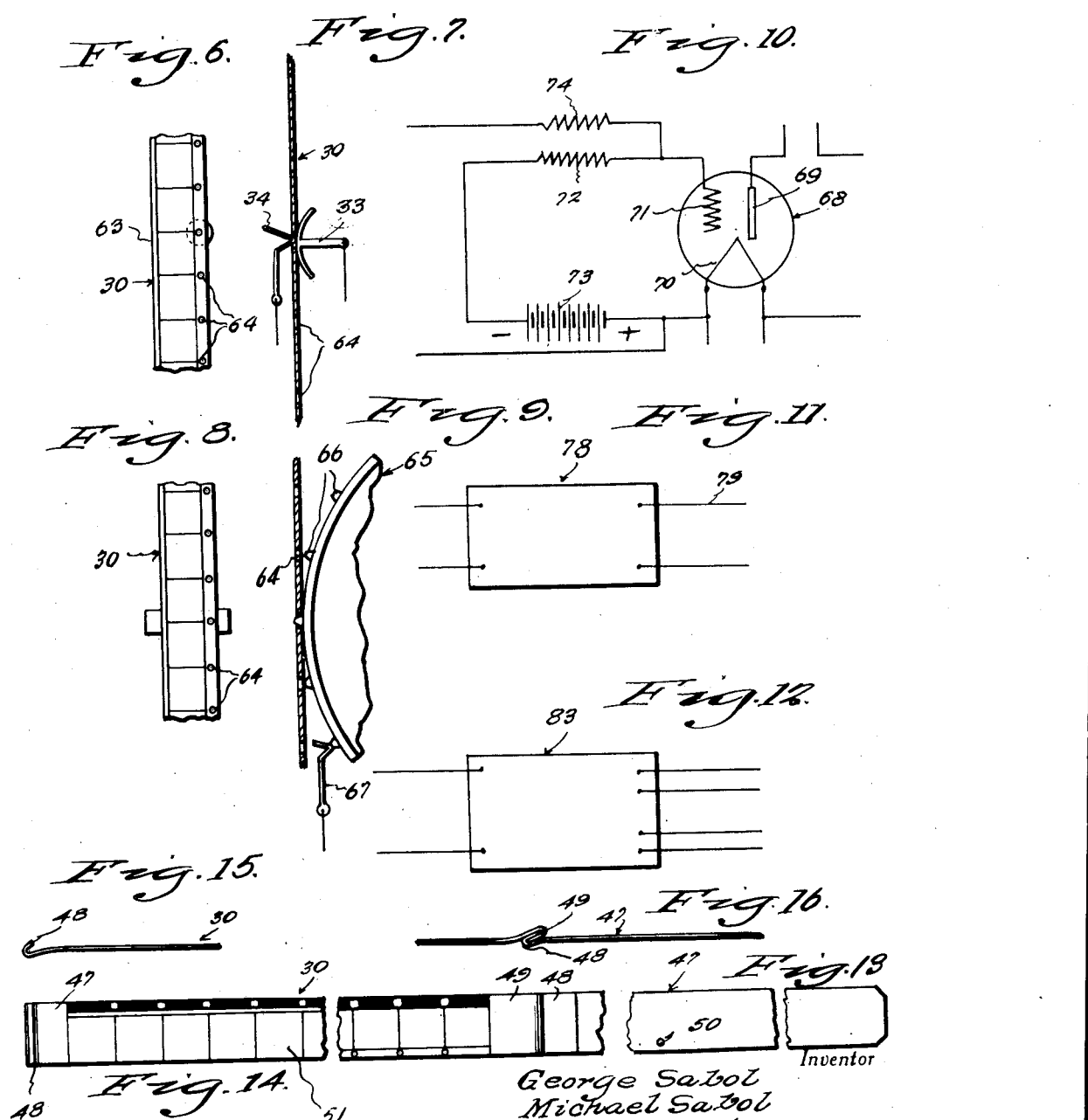

Patented Sept. 19, 1939

2,173,768

UNITED STATES PATENT OFFICE 2,173,768

TALKING MOTION PICTURE SYSTEM

George Sabol, Michael Sabol, and John Sabol, Clairton, Pa.

Original application September 7, 1938, Serial No. 228,848. Divided and this application March 29, 1939, Serial No. 264,810

5 Claims. (Cl. 88—16.2)

Our invention relates to apparatus for showing talking motion pictures present on both sides of a length of sound picture ribbon, the same being made from inexpensive non-explosive material, said apparatus being characterized by simplicity and an absence of complicated gears and sprockets, the apparatus being further characterized by inexpensive ribbon illuminating means arranged to be in operation only at the time and at the instant the particular picture is in the frame for exhibition, said apparatus being capable of being made in a size and arrangement to be enclosed in a cabinet similar to a modern radio cabinet.

Other important objects and advantages of the present invention comprise the provision of a practical and useful arrangement of the character indicated above which is especially adaptable for store window advertising purposes, scientific exhibitions, for showing material of educational character, the precise nature of the arrangements of the invention being evident from a reading of the following description taken in connection with the drawings, wherein for purposes of illustration we have shown preferred embodiments of our invention.

In the drawings:

Figure 2 is a longitudinal sectional view taken through one form of clutch reel employed in said apparatus.

Figure 3 is a transverse vertical sectional view taken through Figure 2 approximately on the line 3—3 and looking toward the right in the direction of the arrows.

Figure 4 is a view similar to Figure 3 of another type of clutch reel.

Figure 5 is a transverse vertical sectional view taken through Figure 4 approximately on the line 5—5 and looking toward the right in the direction of the arrows.

Figure 6 is a plan view of the talking motion picture ribbon in accordance with the present invention, with the margin thereof opposite that of the location of the sound track provided with perforations through which two electrical contacts on opposite sides of the film can come together to close a circuit.

Figure 7 is an enlarged transverse vertical sectional view taken through Figure 6 and showing the relation of the said contacts.

Figure 8 is a view similar to Figure 6 of a form of film operating in connection with a toothed wheel the teeth of which fit into the perforations.

Figure 9 is an enlarged transverse vertical sectional view taken through Figure 8 and showing the operative relation of the teeth of the wheel to the perforations in the film and to the contact.

Figure 10 is a wiring diagram of a suitable arrangement of amplifying components for energizing the vapor lamp which illuminates the passing picture frames on the picture ribbon.

Figure 11 is a diagrammatic representation of the radio amplifier unit with a single output.

Figure 12 is a diagrammatic representation of a special radio amplifier unit having dual outputs.

Figure 13 is a plan view of a fragmentary length of plain picture ribbon in accordance with the present invention.

Figure 14 is a plan view of a picture carrying length of ribbon in accordance with the present invention showing the same connected to the plain portion.

Figure 15 is an edge elevational view showing the hook on one terminal end of the picture carrying ribbon section.

Figure 16 is an edge elevational view of portions of the plain film and of the picture carrying sections showing the hooks thereof operatively engaged.

Figure 1:
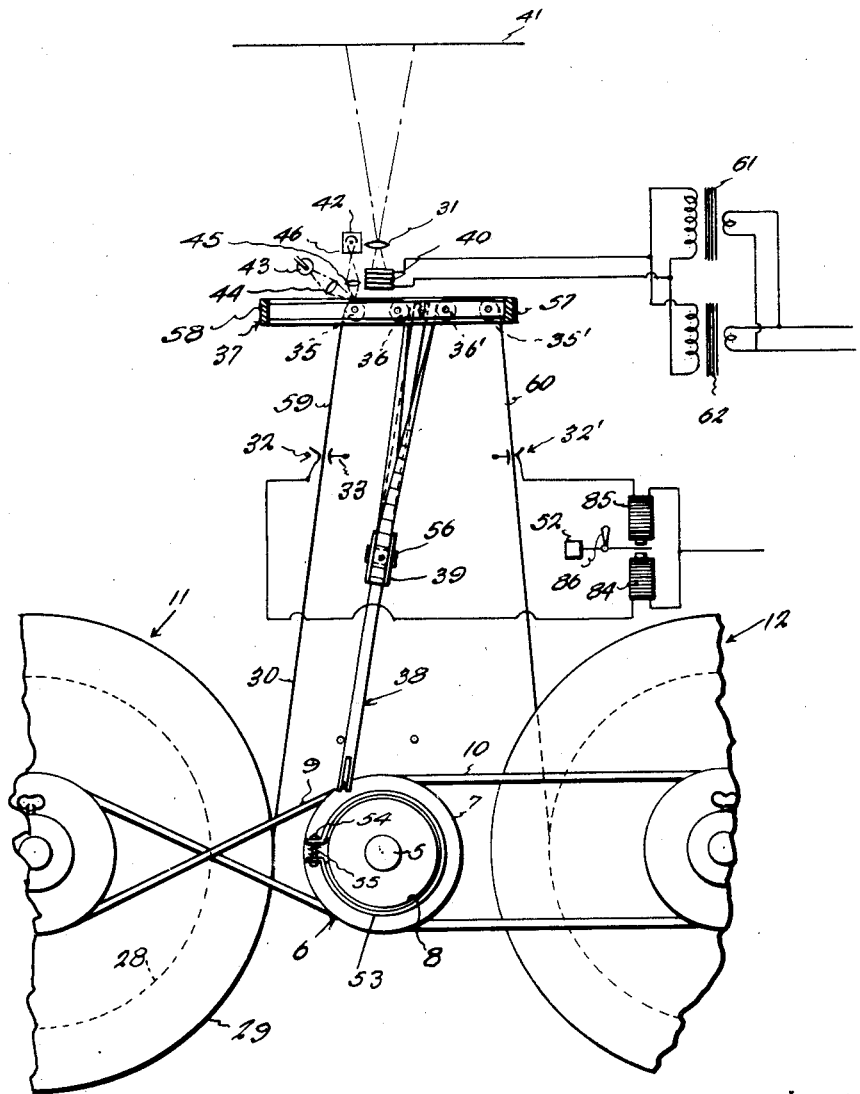
Figure 1 is a general sectional schematic diagrammatic view of the apparatus of the invention showing the mechanical arrangements thereof and the electrical connections thereof.

The subject matter of the present application is divided out of our co-pending application Serial No. 228,848, filed on September 7, 1938, and entitled "System of talking motion pictures."

Referring in detail to the drawings whose figures are described above, and particularly to Figure 1 thereof, showing the general arrangement of the apparatus, the numeral 5 generally designates a shaft which is driven at a constant speed by an electric motor (not shown), the shaft carrying the two fixed pulleys 6 and 7, respectively, and a drum 8. The two pulleys transmit their motion by means of respective belts 9 and 10 to the respective picture ribbon winding reels 11 and 12. The reels may be either of the cam type shown in Figures 2 and 3 or of the spring coil type shown in Figures 4 and 5. Common to both types of reels are the shafts 13 on which is fixed a disk backrest 14, in the case of the form shown in Figure 2, or the drum 14' in the form shown in Figure 4, these having projections 15 and 15', respectively, which fit into depressions in the reels so that the respective elements 14, 14' and the reels 11 or 12 are operatively connected for rotation when the clutch mechanism is engaged. The reels are held against the projections by a single unit consisting of a compression spring 16, 16', respectively, a compression spring 13, 13', respectively, held in place by a stop collar 18, 18', respectively, equipped with a locking screw 19, 19', respectively, which fits into a respective groove 20, 20' cut in the respective shaft 13, 13', these assemblies being readily removable for loosening the respective screws 19, 19'.

The respective one of the belts 9, 10 is trained over the respective one of the pulley forms 21, 21', both of which rotate freely on the respective shafts 13, 13' when the belt moves in one direction, but are rotated so as to rotate the shafts 13, 13' on the corresponding reels when the corresponding belts move in the opposite direction, upon reversal of the motor. In the cam type clutch shown in Figures 2 and 3, this operative connection is accomplished by the spring cam arms 22, which may be of fiber, leather, or the like suitable material, and be arranged at a suitable angle to press against the disk 14, this engagement being maintained by the expanding spring 23 which operates between a stop 24 and a washer 25 riding against the pulley 21. When the belt moves in one direction the pulley 21 rides freely on the shaft 13 but when the belt moves in the opposite direction the cams 22 tend to lock with the plate 14 so that the pulley 21 turns the shaft 13.

In the case of the arrangement shown in Figures 4 and 5, herein called the spring coil type, the pulley 21' has attached to it the drum 25 inside of which is a steel coil helix 26, one end of this helix being attached to the drum 25 and the other end being free, and the whole spring telescoping snugly over the drum. A pin 27 in a collar portion on the pulley 21' is engaged in a groove in the shaft 13' to prevent the pulley 21' from moving longitudinally along the shaft in a right hand direction. When the belt moves the pulley 21' in one direction the pulley rides freely over the drum 14, but when the belt moves in the opposite direction the coil or helix turns the drum 14 and thereby turns the shaft 13 and the reel 11'.

The picture ribbon 30 is wound on both of the reels 11 and 12 to a depth approximately that indicated by the space between the numerals 28 and 29. The picture ribbon is made of some paper or other non-explosive composition, on either or both sides of which there has been previously photographed, processed, or printed or otherwise placed a sequence of picture with sound accompaniment track alongside of the picture frame, as in standard motion picture film. The radius extending from the center of the shafts of the reels to the pointer 28 is approximately three-quarters of the length of a radius extending from the said center to the point 29, and the reels are comparatively large so that they may accommodate as long a ribbon as is desirable. The reels are arranged to rotate at exactly the speed necessary to pass an average of 21 picture frames per second under the projection lens 31.

In operation the picture ribbon starts from one reel, passes through an electrical contact assembly 32, 32', respectively, each consisting of a metallic button 33 and a spring 34, over which the guide rolls 35, 36 and 35', 36', respectively, the rolls being attached to a movable and slidable frame 37 to which is pivoted an arm 38. The ribbon depends and loops around the guide roll 39 which is pivoted on the arm 38, the roll 39 being fixed to the arm 38 and its motion arranged to take place at right angles to that of the rolls 35, 36 and 35', 36'. The ribbon then returns toward the frame 37 and as the ribbon goes once again over the rolls the opposite side or face of the ribbon becomes uppermost. The ribbon then descends and passes through the companion contact arrangements 32, 32', as the case may be, and thence to the reel other than that on which the ribbon originated.

Over the frame 37 and immediately over the moving ribbon is fixed an electric vapor lamp 40 consisting of a glass tube properly filled with mercury, neon, or other suitable gas, and shaped in the form of a helix in a size to just encircle a single picture frame on the ribbon 30. Above this helical vapor lamp is the projection lens 31 which is arranged to project on to the screen 41, a magnified image of the picture on the ribbon, each time that the vapor lamp is energized. The screen 41 may be either a frosted glass or a highly reflecting surface such as a calcium oxide or glass bead. In either case the screen is compounded with a fluorescent material such as uranium oxide and the like, which affords better screen efficiency in that "flicker" is eliminated and the image on the screen is brightened.

Alongside of the vapor lamp 40 is mounted a photoelectric cell 42 and a source of illumination therefor, such as a "Mazda" bulb, and a lens 44 is arranged in such a manner that the light from the source 43 is focused by the lens 44 onto the sound accompaniment track on the ribbon 30. The lens 45 which relates to the photoelectric cell 42 is of a good quality and focuses on a shield 46 which has a small slit, an image of the sound track illuminated by the source 43, the slit in the shield permitting light only from individual "sound waves" of the sound track to enter the photoelectric cell 42.

As shown in Figures 13, 14, 15 and 16, the picture ribbon 30 consists of a blank or plain length 47, one end of which is attached to the respective reel by means of the hook 48 which inter-engages with the hook or depression in the web of the ribbon receiving groove of the reel. The opposite end of this section has a non-conductive oppositely turned hook 49 for engaging with another one of the hooks 48 on an adjacent strip or section. The blank strip 47 is just long enough to pass from one reel, through the companion electrical contact assemblies 32 or 32' over the guide rolls with the loop and a little beyond the electrical contact assemblies 32, 32', respectively, on the opposite side of the arm 38. On this plain section 47 and spaced longitudinally inwardly from the hook 48 at a distance equal to a little more than the distance from 32 to 32' over the guide rolls with the loop, in a perforation 50. To the grip hook 48 is hooked the hook-like dielectric member 49 on the picture ribbon section 51, which section 51 has impressed on its opposite side or on both sides, an arrangement of motion picture frames with accompanying sound track. On the opposite end of the section 51 and on opposite faces thereof is the beginning and end of two picture series. In an instance wherein one series of pictures ends on one face of the picture ribbon, another series of pictures begins immediately on the opposite face or side of the ribbon. In installing the blank or plain section 47, this section is coiled first on the reel and commences from the point 28 on the reel. Following the section 47 and hooked to its terminal is the picture containing section 51 which ends in a grip hook 48 as already explained.

Operation

Referring to Figure 1 of the drawings, the reel 11 is shown as having just been operated to coil thereon the picture ribbon from the reel 12. The electric motor (not shown) connected to an automatic reversing switch 52, is about to reverse its rotation. Assuming that the motor has reversed itself, the shaft 5 will now rotate clockwise and thereby cause the corresponding one of the pulleys 6 and 7 to rotate also clockwise as well as the drum 8. As the drum rotates, it drags the friction band 53 around the right, the friction on this band with the drum 8, being adjustable by the screw bolt and compression spring 54, and 55, respectively, so that the band moves the arm 38 about its fulcrum mounting 56 which, in turn, moves the frame 37 from the stop 57 to the stop 58, this action exposing the opposite face of the ribbon 30 to the vapor lamp 40. As indicated, the opposite ends of the arm 38 are pivotally and slidably connected to the frame 37 and to the friction band 53, respectively.

During the action described the clutch arrangement of the reel 11 was automatically disengaged and the clutch on the reel 12 automatically engaged, so that the reel 12 is then the take-up reel. The reels rotate at such a speed that when the ribbon is half coiled on them, the velocity of the ribbon is about 21 picture frames per second, which is normal for good talking motion pictures. Because the reels rotate at a constant velocity at all times, it is necessary that the ribbon shall coil on the reels from the point 28 to the point 29, with the ratio of the distance between the two points being about as 3 is to 4. The reels will thereby pass about 18½ frames per second at the start of the showing of the picture and about 23½ frames per second at the close of the showing of the picture, this arrangement giving very satisfactory results. While the reel 12 is acting as a take-up reel, the friction washer in the case of the type shown in Figure 2, and the drum in the case of the type shown in Figures 4 and 5, works against the reel 11 and helps to keep the ribbon taut, and the ribbon thereby coils on the reel 12 snugly and at no time is there a loose or hanging ribbon.

Whether the ribbon in passing through the frame travels to the right or to the left, the fixed photoelectric cell 42 picks up the sound impulses from the ribbon. These sound impulses are made audible by a standard radio amplifier or high gain amplifier, such as is present in good commercial radios. By means of a simple electric switch, the photoelectric cell 42 can be disconnected when the radio is to be used for broadcast programs, supposing that the device of the invention is installed in a radio cabinet having a radio receiving set therein.

At some convenient place along the ribbon, such as the places designated by the numerals 59 and 60, there is arranged a synchronizing unit. The purpose of this unit is to control surge of electric power into the primary of one or more electrical transformers such as those designated 61 and 62. The secondaries of these transformers are permanently connected to the electric vapor lamp 40 and serve to transfer the surge of power from the primaries of the transformers to the vapor lamp 40 in a form suitable for proper energization of the vapor lamp. The surge of power referred to occurs every time a picture frame on the ribbon is directly under the electric vapor lamp 40 and in position for projection. This surge of power is governed by the synchronizing elements on the ribbon itself, so that irrespective of the velocity of the ribbon, the projection of the picture frames on the screen 41 follows in perfect order or good motion pictures. The synchronization of these electric power surges is effected by any of the following methods or means.

A suitable arrangement is shown in Figures 6 and 7, wherein the picture ribbon is provided preferably opposite the sound track 63 with small perforations 64 which are placed exactly one frame apart and are about one-sixty-fourth of an inch in diameter. This perforated margin of the picture ribbon is arranged to pass up or down, as the case may be, between two electrical contacts, one a metallic button 33 and the other a fine composition steel spring wire 34 already referred to, the wire and the button being arranged to contact with each other as each perforation of the ribbon passes.

Another suitable arrangement of the character indicated is shown in Figures 8 and 9 of the drawings, and this involves a wheel 65 having teeth 66 projecting therefrom individually engageable with a steel spring wire contact 67, the teeth fitting into the perforations 64 in the film, so that a contact is made between an individual one of the teeth 66 for each passage of a picture frame.

A still further arrangement, shown in Figure 10 of the drawings, contemplates employment of a three element thermionic tube 68, comprising a filament, a grid, and a plate, with the plate 69 connected in series with the primaries of the transformers 61 and 62. To this plate circuit is supplied the positive terminal of a suitable direct current potential. The negative of this potential is connected to the filament 70 of the tube 68, while the grid 71 is connected in series with a resistance 72, to the negative terminal of the direct current potential 73, which may be merely a dry pile. The positive terminal of the direct current potential 73 is connected to the filament. The magnitude of the direct current potential 73 is such that it just prohibits the flow of electricity between the plate and the filament. Directly across the grid and the filament and through the resistance 74, of a smaller capacity than the resistance 72, is connected the contact button 33, the contact 34, or the sprocket wheel 65 or its wire contact 67. Each time that one of these elements makes contact with its companion, as the ribbon travels, the potential across the grid and filament is greatly lowered and there is produced a surge of power between the plate circuit and the filament of the tube 68. This surge of electric power energizes the transformers, and this causes immediate lighting of the vapor lamps, which effects illumination of the passing picture frame in its proper order for projection in the form of motion pictures.

Assuming that the reel 12 has just completed coiling the entire picture ribbon thereon, the hook 48 now appears on the right hand side of the arm 38 and in a position a little below the contact assembly 32'. In this position of the parts, the contact 32 on the left hand side of the arm 38 closes the circuit to the electro-magnet 84, and the electro-magnet 84 immediately kicks the reversing switch 52, thereby producing reversing of the motor (not shown), so that the device goes into operation to show the opposite or reverse face of the picture ribbon. The magnet 85 operates as described in connection with the magnet 84 when the conductor hook 48 appears on the left hand side of the arm 39. The perforation 50 on the flange 47 of the ribbon allows the conductor hook 48 to kick the reversing switch at the proper time.

The armature of the reversing switch 52 has a handle 86 which is attached thereto to enable manually operating the reversing switch for reversing the picture ribbon at will whenever the ribbon is entirely coiled or not on either of the reels 11 and 12. This manual operation of the reversing switch also enables bringing back the conductor hook below the appropriate one of the contact assemblies 32, 32' if the hook has already gone some distance toward the opposite reel. When the hook 48 is a little below either of the contact assemblies 32, 32' the reels can be best removed and replaced, as the blank strip 47 of the ribbon is then in proper and easiest position for either removal or exchange of reels. When the hook 48 is below the contact assemblies 32, 32' the stopping switch (not shown) of the motor is opened and the full reel can then be exchanged for a new full reel, after which the motor (not shown) is again closed, the machine thereby becoming ready to show the picture ribbon once again.

Although we have shown and described herein preferred embodiments of our invention, it is to be definitely understood that we do not desire to limit the application of our invention thereto, and any change or changes may be made in the construction and arrangement of the parts, and in the manner of operating the same, within the spirit of our invention and the scope of the subjoined claims.

Having described the invention, what is claimed as new is:

1. A motion picture device for exhibiting the subject matter within picture frames on the opposite sides of a ribbon, said device comprising a constant speed motor, a dual rotor driven thereby, a first ribbon reel, a second ribbon reel, means operatively connecting said reels to said dual rotor, reversing means for said motor, a slidable exhibitor frame, a projecting light source arranged with respect to said frame, a fulcrumed lever operatively connected at one end to said frame and at its opposite end to a part of said dual rotor, said reversing means comprising a first contact and a second contact located at opposite sides of said arm and between said reels, said ribbon being wound upon said reels and running across said frame and adjacent said contacts and spaced portions of the ribbons having elements to close the contacts upon engagement therewith, a roller mounted at the fulcrum of said arm and around which a middle portion of the ribbon is reverse looped midway of its transit across said frame, and synchronizing means for energizing said light source only at registration therewith of successive picture frames on the ribbon.

2. A motion picture device for exhibiting the subject matter within picture frames on the opposite sides of a ribbon, said device comprising a constant speed motor, a dual rotor driven thereby, a first ribbon reel, a second ribbon reel, means operatively connecting said reels to said dual rotor, reversing means for said motor, a slidable exhibitor frame, a projecting light source arranged with respect to said frame, a fulcrumed lever operatively connected at one end to said frame and at its opposite end to a part of said dual rotor, said reversing means comprising a first contact and a second contact located at opposite sides of said arm and between said reels, and running across said frame and adjacent said contacts and spaced portions of the ribbons having elements to close the contacts upon engagement therewith, a roller mounted at the fulcrum of said arm and around which a middle portion of the ribbon is reverse looped midway of its transit across said frame, and synchronizing means for energizing said light source only at registration therewith of successive picture frames on the ribbon, said picture ribbon including a sound track, and sound apparatus energizing means operatively related to said sound track.

3. A motion picture device for exhibiting the subject matter within picture frames on the opposite sides of a ribbon, said device comprising a constant speed motor, a dual rotor driven thereby, a first ribbon reel, a second ribbon reel, means operatively connecting said reels to said dual rotor, reversing means for said motor, a slidable exhibitor frame, a projecting light source arranged with respect to said frame, a fulcrumed lever operatively connected at one end to said frame and at its opposite end to a part of said dual rotor, said reversing means comprising a first contact and a second contact located at opposite sides of said arm and between said reels, said ribbon being wound upon said reels and running across said frame and adjacent said contacts and spaced portions of the ribbons having elements to close the contacts upon engagement therewith, a roller mounted at the fulcrum of said arm and around which a middle portion of the ribbon is reverse looped midway of its transit across said frame, and synchronizing means for energizing said light source only at registration therewith of successive picture frames on the ribbon, said synchronizing means comprising a pair of contactors through which the ribbon passes, said contactors being adapted to engage through openings formed in one edge of the ribbon and spaced at picture frame distance.

4. A motion picture device for exhibiting the subject matter within picture frames on the opposite sides of a ribbon, said device comprising a constant speed motor, a dual rotor driven thereby, a first ribbon reel, a second ribbon reel, reversing means for said motor, a slidable exhibitor frame, a projecting light source arranged with respect to said frame, a fulcrumed lever operatively connected at one end to said frame and at its opposite end to a part of said dual rotor, said reversing means comprising a first contact and a second contact located at opposite sides of said arm and between said reels, said ribbon being wound upon said reels and running across said frame and adjacent said contacts and spaced portions of the ribbons having elements to close the contacts upon engagement therewith, a roller mounted at the fulcrum of said arm and around which a middle portion of the ribbon is reverse looped midway of its transit across said frame, and synchronizing means for energizing said light source only at registration therewith of successive picture frames on the ribbon, said synchronizing means comprising a conductive wheel having teeth spaced at picture frame intervals to engage in holes formed in the ribbon, and a contactor engageable with the teeth.

5. A motion picture device for exhibiting the subject matter within picture frames on the opposite sides of a ribbon, said device comprising a constant speed motor, a dual rotor driven thereby, a first ribbon reel, a second ribbon reel, means operatively connecting said reels to said dual rotor, reversing means for said motor, a slidable exhibitor frame, a projecting light source arranged with respect to said frame, a fulcrumed lever operatively connected at one end to said frame and at its opposite end to a part of said dual rotor, said reversing means comprising a first contact and a second contact located at opposite sides of said arm and between said reels, said ribbon being wound upon said reels and running across said frame and adjacent said contacts and spaced portions of the ribbons having elements to close the contacts upon engagement therewith, a roller mounted at the fulcrum of said arm and around which a middle portion of the ribbon is reverse looped midway on its transit across said frame, and synchronizing means for energizing said light source only at registration therewith of successive picture frames on the ribbon, said synchronizing means comprising a pair of contactors through which the ribbon passes, said contactors being adapted to engage through openings formed in one edge of the ribbon and spaced at picture frame distance, said synchronizing means further comprising a radio tube circuit having the grid circuit thereof and the filament circuit thereof respectively connected to the contactors.

GEORGE SABOL.
MICHAEL SABOL.
JOHN SABOL.